(12) United States Patent
Stanton et al.

(10) Patent No.: US 8,385,333 B2
(45) Date of Patent: Feb. 26, 2013

(54) MECHANISM FOR CLOCK SYNCHRONIZATION

(75) Inventors: Kevin Stanton, Hillsboro, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 12/495,500

(22) Filed: Jun. 30, 2009

(65) Prior Publication Data

US 2010/0329285 A1    Dec. 30, 2010

(51) Int. Cl.
H04L 12/28    (2006.01)
(52) U.S. Cl. ........................................ 370/389; 370/503
(58) Field of Classification Search ................. 370/503, 370/350, 395.62, 389, 349; 709/208, 248, 709/400
See application file for complete search history.

(56) References Cited

U.S. PATENT DOCUMENTS

| | | | |
|---|---|---|---|
| 5,566,180 A | 10/1996 | Eidson et al. | |
| 6,351,821 B1 * | 2/2002 | Voth | 713/600 |
| 6,947,448 B2 * | 9/2005 | Tomita | 370/471 |
| 7,130,958 B2 * | 10/2006 | Chou et al. | 711/103 |
| 8,175,085 B2 * | 5/2012 | Malwankar et al. | 370/357 |
| 2002/0163932 A1 | 11/2002 | Fischer et al. | |
| 2006/0083266 A1 | 4/2006 | Lim et al. | |
| 2007/0223459 A1 * | 9/2007 | Crowle et al. | 370/353 |
| 2008/0080562 A1 | 4/2008 | Burch et al. | |
| 2008/0243950 A1 | 10/2008 | Webman et al. | |
| 2009/0052431 A1 * | 2/2009 | Kroener et al. | 370/350 |
| 2010/0040090 A1 * | 2/2010 | Lee et al. | 370/503 |

OTHER PUBLICATIONS

Kevin B. Stanton—"Overview of Clock and Time Synchronization across a heterogeneous bridged LAN using IEEE p802.1AS"; Nov. 2008.
International Search Report corresponding to PCT/US2010/034350, dated Nov. 26, 2010.
PCT Written Opinion corresponding to PCT/US2010/034350, dated Nov. 26, 2010.
International Preliminary Report on Patentability mailed Jan. 12, 2012.

* cited by examiner

*Primary Examiner* — Brenda H Pham
(74) *Attorney, Agent, or Firm* — Pillsbury Winthrop Shaw Pittman LLP

(57) ABSTRACT

A method and apparatus for synchronizing time between a master device and a target device arranged across a network, wherein the target device communicates to the master device through a PCIe interconnect includes transmitting a first message at a first time from the master device to the target device, the first message including a message indicator; and receiving a reply message at a subsequent time from the target device to the master device, the reply message including the message indicator.

17 Claims, 7 Drawing Sheets

- General:
  - Time values reflect _actual_ transmission/reception times for successful TLP transfer (values associated with retried TLPs must be discarded)
- Master:
  - Maintains TNumber counter
  - TNumber++ placed in each TimeSync Msg
  - Sets M:=1
  - Remembers t1 and t4
- Target
  - Responds for each TimeSync Msg received
  - Remembers TNumber received and echos in response
  - Sets M:=0

MECHANISM FOR CLOCK SYNCHRONIZATION

BACKGROUND

This disclosure relates generally to the field of timing control and, more specifically, to systems and methods for synchronizing clock signals between computer devices connected across a computer network.

For devices connected across a network, precise time synchronization is difficult to achieve. With mechanisms like IEEE 802.1 AS/D5.0 standard entitled "Timing and Synchronization for Time-Sensitive Application in Bridged Local Area Networks" published on Feb. 26, 2009, the standard network elements of such a system can maintain precise time synchronization. However, synchronizing between different networks and other interconnect technologies can only be done through software mechanisms. Because precise time control of software operations is not supported on most CPU architectures, and because software communication over Peripheral Component Interconnect Express (PCIe) uses Transaction Layer Packets (TLPs) which are subject to queuing delays and other non-deterministic (at least from the software point of view) delays, it is not possible to control the component communication latencies. This reduces the accuracy considerably, to the point that some applications cannot be supported at acceptable quality levels (e.g., multichannel audio), and it obviously requires specific system software support, which is less desirable than a hardware solution.

What is needed is a hardware mechanism that allows device connected through a PCIe or PCIe derived architecture (such as DMI (Direct Media Interface)) to be synchronized in time.

DETAILED DESCRIPTION

Figure 1:
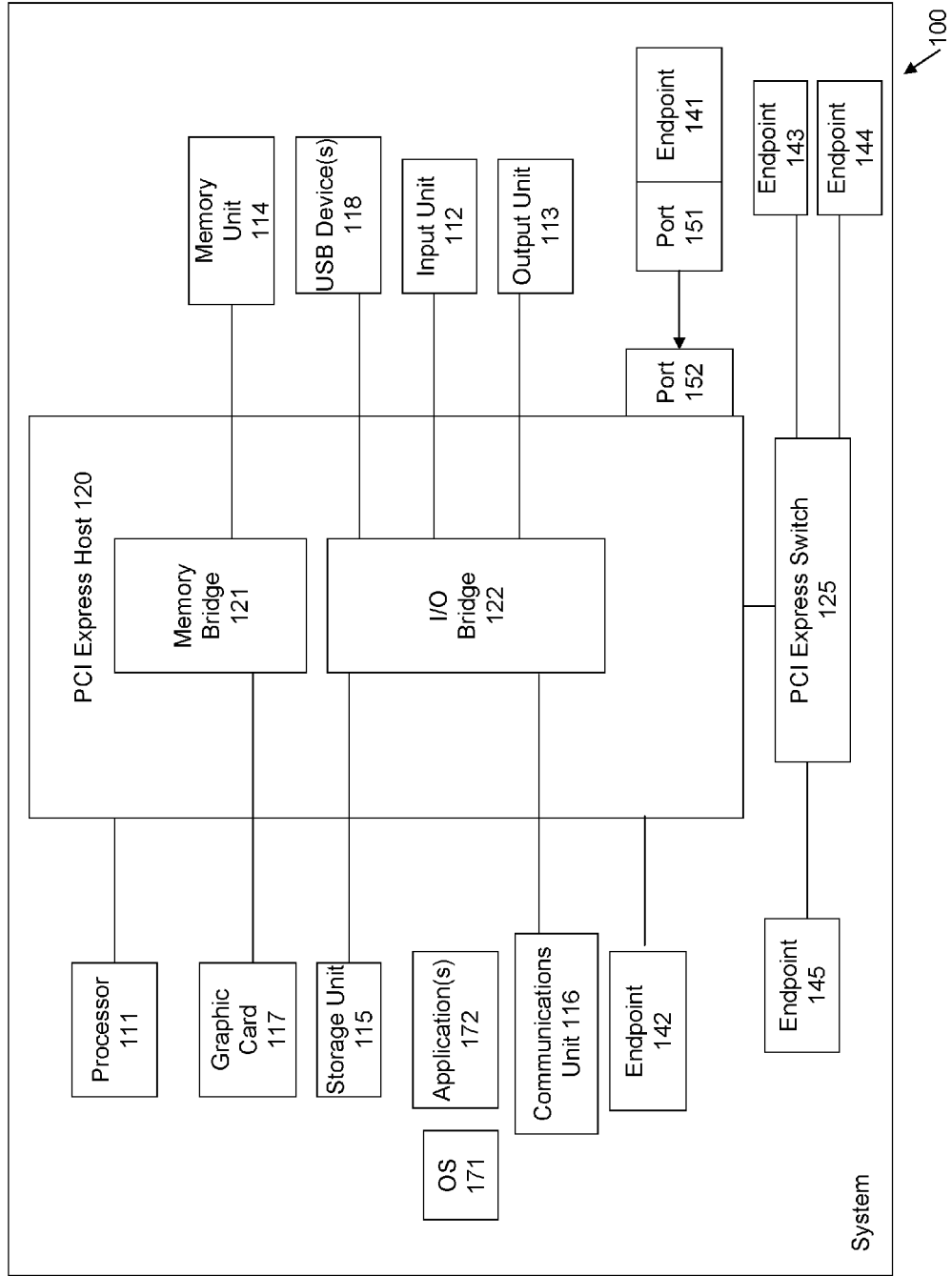
FIG. 1 is a schematic block diagram illustration of a system able to utilize PCIe packets in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a method is disclosed that comprises transmitting a first message at a first time from a master device to a target device to synchronize time between the master device and the target device arranged across a network, wherein the target device communicates to the master device through a PCIe interconnect, the first message including a message indicator; and receiving a reply message at a subsequent time from the target device to the master device, the reply message including the message indicator.

In accordance with various embodiments of this disclosure, a computer program product is disclosed that comprises a computer usable medium having a computer readable program code embodied therein, said computer readable program code adapted to be executed to implement a method comprising attaching a header to a transaction layer protocol layout packet at a master device to synchronize time between the master device and a target device arranged across a network, wherein the header is arranged to identify the packet as a time synchronization packet; and transmitting the packet with attached header from a master device to a target device to synchronize time between the master and target device.

In accordance with various embodiments of this disclosure, a system is disclosed that comprises a controller configured to apply modified framing to a header of a transaction layer protocol layout packet at a master device, wherein the header arranged to identify the packet as a time synchronization packet; a transmitter configured to transmit the packet with the modified framing from the master device to a target device to synchronize time between the master device and target device and a receiver configured to receive the transmitted packet.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Turning now to the various aspects of the disclosure, most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

Although portions of the discussion herein relate, for demonstrative purposes, to PCIe communications or devices, embodiments of the invention may be used with other types of communications or devices, for example, communications or devices utilizing transfer of packetized data over high-speed serial interconnects, communications or devices utilizing flow control-based link management, communications or devices utilizing credit-based flow control, communications or devices utilizing a fully-serial interface, communications or devices utilizing a split-transaction protocol implemented with attributed packets, communications or devices that prioritize packets for improved or optimal packet transfer, communications or devices utilizing scalable links having one or more lanes (e.g., point-to-point connections), communications or devices utilizing a high-speed serial interconnect, communications or devices utilizing differentiation of different traffic types, communications or devices utilizing a highly reliable data transfer mechanism (e.g., using sequence numbers and/or End-to-end Cyclic Redundancy Check (ECRC)), communications or devices utilizing a link layer to achieve integrity of transferred data, communications or devices utilizing a physical layer of two low-voltage differentially driven pairs of signals (e.g., a transmit pair and a receive pair), communications or devices utilizing link initialization including negotiation of lane widths and frequency of operation, communications or devices allowing to transmit a data packet only when it is known that a receiving buffer is available to receive the packet at the receiving side, communications or devices utilizing request packets and/or response packets, communications or devices utilizing Message Space and/or Message Signaled Interrupt (MSI) and/or in-band messages, communications or devices utilizing a software layer configuration space, communications or devices utilizing a Maximum Payload Size (MPS) parameter, or the like.

FIG. 1 schematically illustrates a block diagram of a system 100 able to utilize PCIe packets having a modified framing mechanism in accordance with some demonstrative embodiments of the invention. System 100 may be or may include, for example, a computing device, a computer, a Personal Computer (PC), a server computer, a client/server system, a mobile computer, a portable computer, a laptop computer, a notebook computer, a tablet computer, a network of multiple inter-connected devices, or the like.

System 100 may include, for example, a processor 111, an input unit 112, an output unit 113, a memory unit 114, a storage unit 115, a communication unit 116, and a graphics card 117. System 100 may optionally include other suitable hardware components and/or software components.

Processor 111 may include, for example, a Central Processing Unit (CPU), a Digital Signal Processor (DSP), a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) 171 of system 100 or of one or more software applications 172.

Input unit 112 may include, for example, a keyboard, a keypad, a mouse, a touch-pad, a stylus, a microphone, or other suitable pointing device or input device. Output unit 113 may include, for example, a cathode ray tube (CRT) monitor or display unit, a liquid crystal display (LCD) monitor or display unit, a screen, a monitor, a speaker, or other suitable display unit or output device. Graphics card 117 may include, for example, a graphics or video processor, adapter, controller or accelerator.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

Communication unit 116 may include, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some embodiments, the components of system 100 may be enclosed in, for example, a common housing, packaging, or the like, and may be interconnected or operably associated using one or more wired or wireless links. In other embodiments, for example, components of system 100 may be distributed among multiple or separate devices, may be implemented using a client/server configuration or system, may communicate using remote access methods, or the like.

System 100 may further include a PCIe host bridge 120 able to connect among multiple components of system 100, e.g., among multiple PCIe devices or PCIe endpoints. The PCIe host bridge 120 may include a memory bridge 121 or other memory controller, to which the memory unit 114 and/or the graphics card 117 may be connected. The PCIe host bridge 120 may further include an Input/Output (I/O) bridge 122, to which the input unit 112, the output unit 113, the storage unit 115, the communication unit 116, and one or more Universal Serial Bus (USB) devices 118 may be connected.

System 100 may further include a PCIe switch 125 able to interconnect among multiple PCIe devices or PCIe endpoints. In some embodiments, the PCIe switch 125 may be implemented as a separate or stand-alone unit or component; in other embodiments, the PCIe switch 125 may be integrated in, embedded with, or otherwise implemented using the PCIe host bridge 120 or other suitable component.

The topology or architecture of FIG. 1 are shown for demonstrative purposes, and embodiments of the invention may be used in conjunction with other suitable topologies or architectures. For example, in some embodiments, memory bridge 121 is implemented as a memory controller and is included or embedded in the PCIe host bridge 120. In some embodiments, a "north bridge" or a "south bridge" are used, and optionally include the PCIe host bridge 120 and/or a similar PCIe host component. In some embodiments, memory bridge 121 and PCIe host bridge 120 (and optionally the processor 111) are implemented using a single or common Integrated Circuit (IC), or using multiple ICs. Other suitable topologies or architectures may be used.

The PCIe host bridge 120 and/or the PCIe switch 125 may interconnect among multiple PCIe devices or endpoints, for example, endpoints 141-145. Some PCIe devices or endpoints (e.g., PCIe endpoints 141 and 142) are connected directly through the PCIe host bridge 120; whereas other PCIe endpoints (e.g., PCIe endpoints 143-145) are connected indirectly using the PCIe switch 125. Some embodiments allow or enable communications utilizing PCIe packets having a modified framing mechanism only between (or among) PCIe devices or endpoints that are connected directly through the PCIe host bridge 120 (namely, only between endpoints 141 and 142); and disallow or disable communications utilizing PCIe packets having a modified framing mechanism between (or among) PCIe devices or endpoints that are connected indirectly, or not connected directly through the PCIe host bridge 120, or connected indirectly through the PCIe switch 125 (namely, among endpoints 143-145, or between endpoint 141 and endpoints 143-145, or between endpoint 142 and endpoints 143-145).

The PCIe host bridge 120 and/or the PCIe switch 125 may interconnect among multiple PCIe endpoints or PCIe devices, for example, endpoints 141-145. For demonstrative purposes, PCIe endpoint 141 may send data to the memory bridge 121 via ports 151, 152; accordingly, endpoint 141 is referred to herein as "sending endpoint" or "sending device", whereas the memory bridge 121 is referred to herein as "receiving endpoint" or "receiving device". Other components may operate as a sending device and/or as a receiving device. For example, processor 111 may be a sending device and memory unit 114 may be a receiving device; USB device 118 may be a sending device and storage unit 115 may be a receiving device; the memory bridge 121 may operate as a receiving device (e.g., vis-a-vis a first endpoint or component) and/or may operate as a sending device (e.g., vis-a-vis a second endpoint or component); or the like. In some embodiments, the receiving device may send back data or control data to the sending device, or vice versa; for example, the communication between the sending device and the receiving device may be unilateral or bilateral.

Figure 2:
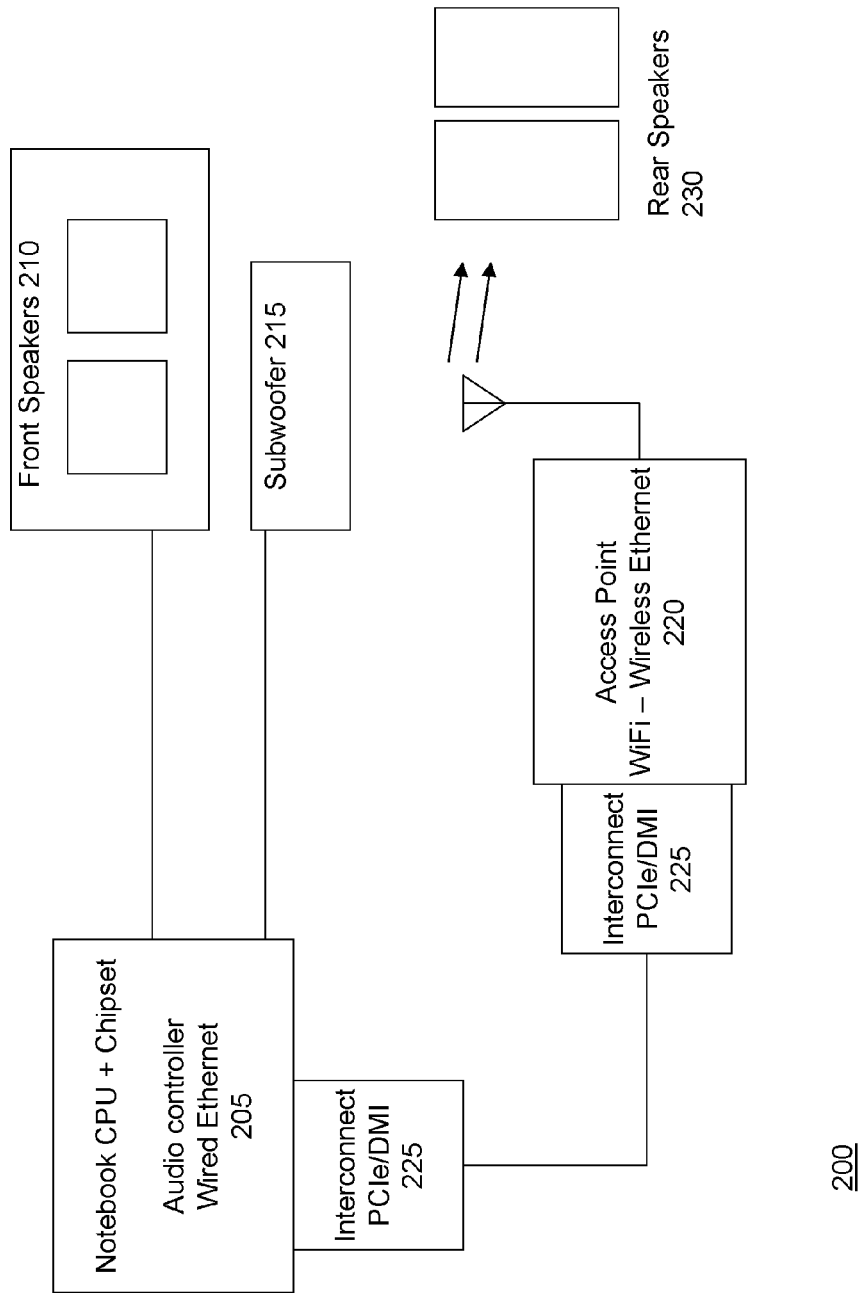
FIG. 2 schematically illustrates an exemplary embodiment in accordance with an aspect of the present disclosure.

FIG. 2 schematically illustrates an exemplary embodiment in accordance with an aspect of the present disclosure. The disclosure can be applied to wide range of applications, from synchronizing multiple audio channels in an audio-video system, shown generally at 200, to industrial applications in plant machinery and test instrumentation. Notebook computer 205 including components such as a CPU, chipset, high definition audio (e.g., Azalia by Intel), gigabit wired Ethernet is connected to front speakers 210 and subwoofer 215. Notebook computer 205 is connected to a wireless access point 220 (e.g., WiFi, wireless Ethernet) via interconnect 225 (e.g., PCIe, DMI). Rear speakers 230 are in communication with notebook computer 205 via wireless access point 220. The networks can be substituted with other networking or interconnect technologies/mechanisms such as USB (Universal Serial Bus), Bluetooth, other PAN (Personal Area Networks), HD (High Definition) Audio etc, as would be apparent.

In systems like FIG. 2, precise time synchronization (~microsecond accuracy) is required to maintain for the listener the correct phase relationships between the sound produced by front speakers 210 and rear speakers 230. In conventional systems, this cannot be done because there is no precise mechanism to control the "presentation time" for front speakers 210 and rear speakers 230. Because of the latency through the WiFi connection is relatively long, it is necessary to buffer and delay the signals presented to front speakers 210. However, because the WiFi latency is not precisely controlled, without precisely synchronized local clocks the best that can be conventionally done is to approximate the expected latency and delay the front speaker signals accordingly. With precisely synchronized local clocks, audio data can specify a "presentation time" which will be honored by the speakers, allowing the data itself to be buffered with only loose constraints needed to prevent buffer under/overrun conditions.

Figure 3:
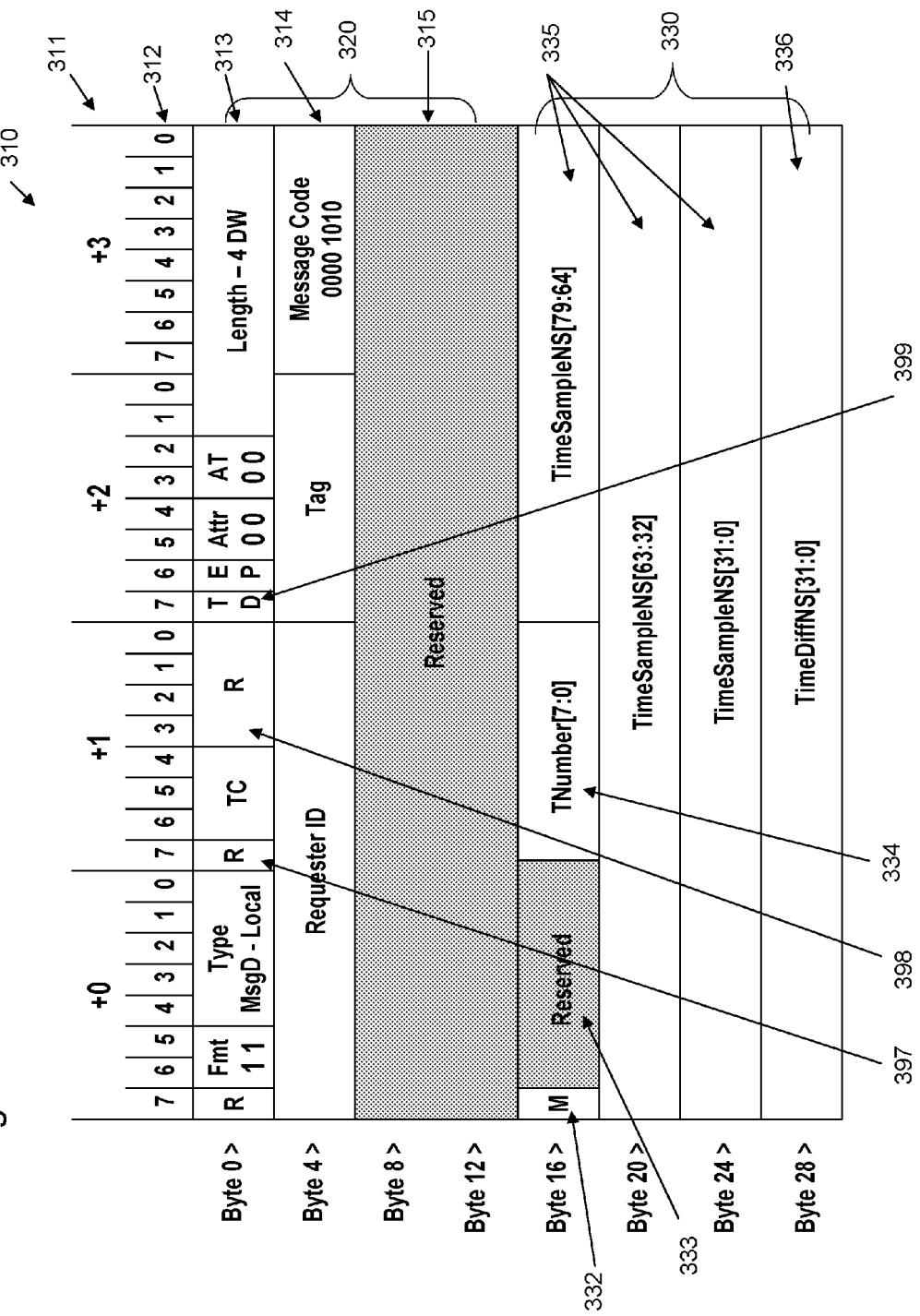
FIG. 3 is a schematic block diagram illustration of structure of a PCIe packet in accordance with various aspects of the present disclosure.

FIG. 3 schematically illustrates structure of a PCIe packet 310 including a messaging mechanism used in conjunction with a modified framing mechanism for exchanging time sample information in accordance with various aspects of the present disclosure. Although portions of the discussion herein relate, for example, to PCIe TLP structure utilizing 64-bit addressing, embodiments of the disclosure are not limited in this regard, and may be used in conjunction with other PCIe TLP structures, for example, structures utilizing 32-bit addressing or other suitable structures or sizes.

Packet 310 is a four Double Word structure and includes header portion 320, data portion 330 and digest portion (not shown). The terms "Double Word" or "DWord" or "DW" as used herein may include, for example, a data unit having a size of four bytes. First row 311 indicates the byte offset (for example, +0, +1, +2 and +3); and second row 312 indicates the bit count (for example, eight bits numbered 0 to 7). Header 320 includes fields of control information (including, for example, a format field, a type field, a length field, an ID field, a tag field, and the like) occupying eight bytes, as indicated in rows 313 and 314. Row 315 is a 64-bit address, that is reserved. Rows 313-315 correspond to the header portion 320 of packet 310.

Data portion 330 of TLP 310 is used to carry payload data, where applicable. Some TLP's may include a data payload portion 330, whereas other TLPs may not include a data payload portion 330. Data portion 330 may include one or more designated bits or flags or fields of header 330, for example, M bit or flag 332 and/or reserved field 333, may be used to indicate if the message is being transmitted by the Time Master on a given link, or by the Time Target. TNumber field 334 may be used to indicate the serial number of this measurement, used by receiver to correlate timestamps. TimeSampleNS field 335 may be used to indicate a sampled time value in nanoseconds, for example, for measurement TNumber-1 (mod 256). TimeDiffNS field 336 may be used to indicate a time difference value in nanoseconds, for example, for measurement TNumber-1 (mod 256).

Digest portion (not shown) includes an optional TLP digest that may be appended to the TLP. In some aspects, packet 310 includes additional substantive data or non-ECEC data stored and/or carried in the space corresponding to a TLP digest. The additional space in digest does not store ECRC information, and instead stores other or alternative information, for example, application-specific data or non-ECRC data.

In some aspects, the header of TLP 310 includes one or more indication bits or flags or fields to indicate the presence of a TLP digest having application-specific data or non-ECRC data. For example, a TLP Digest (TD) indication bit 399 may indicate digest presence. One or more designated bits or flags or fields of header 320, for example, reserved bit 397 and/or reserved field 398, may be used to indicate that the digest includes application-specific data or non-ECRC data, to indicate that the digest does not include ECRC information, to indicate that ECRC check is to be ignored, and/or to indicate that substantive data or non-ECRC data should be read or collected (e.g., by the receiving device) from the space corresponding to the TLP digest or from a pre-defined portion of that space.

Figure 4:
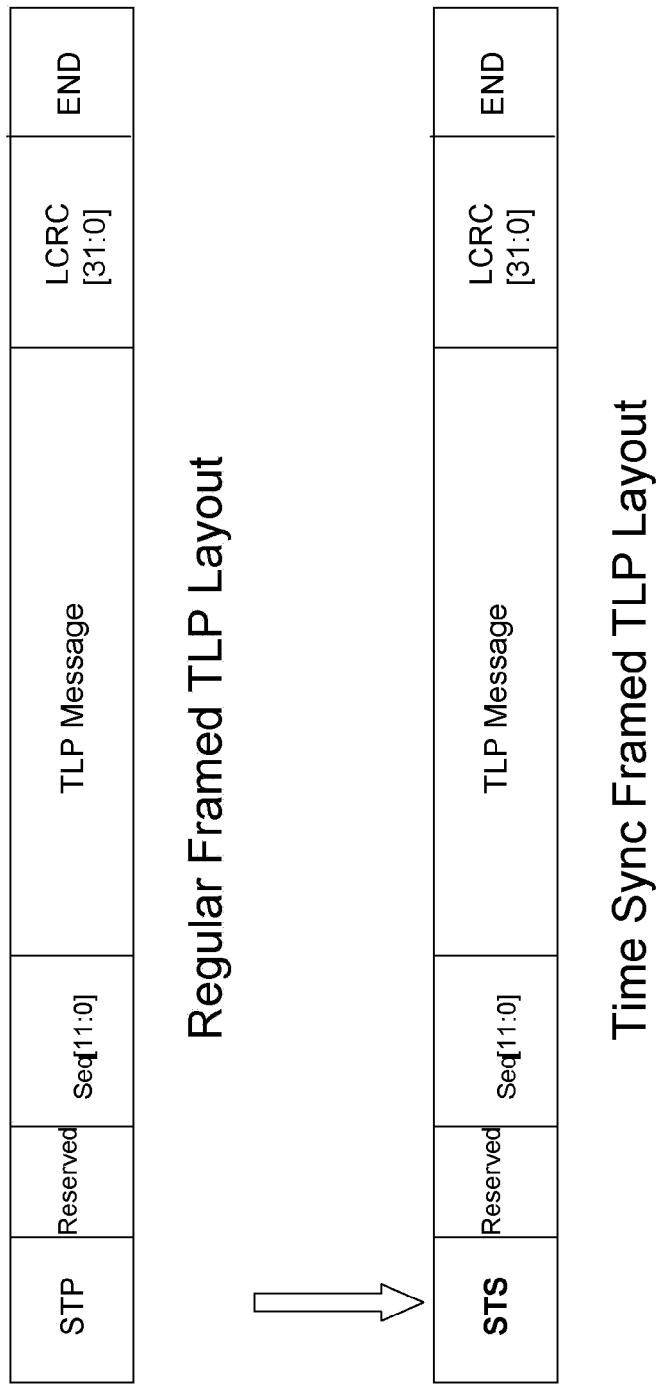
FIG. 4 illustrates a modified framing mechanism used for first and second generation encoding (2.5 and 5 GT/s with 8b/10b encoding) in accordance with various aspects of the present disclosure.

FIG. 4 illustrates a modified framing mechanism used for first and second generation encoding (2.5 and 5 GT/s with 8b/10b encoding) in accordance with various aspects of the present disclosure. The structure of a PCIe packet includes a modified framing messaging mechanism for exchanging time sample information. A TLP with unmodified framing is shown on top and the Time Sync TLP with modified framing is shown on bottom. The section labeled "TLP Message" for the Time Sync TLP is shown in FIG. 3. The Seq[11:0] and LCRC[31:0] fields are the sequence number and link CRC added by the data link layer. A difference is the use of the STS start symbol instead of the STP framing symbol.

Figure 5:
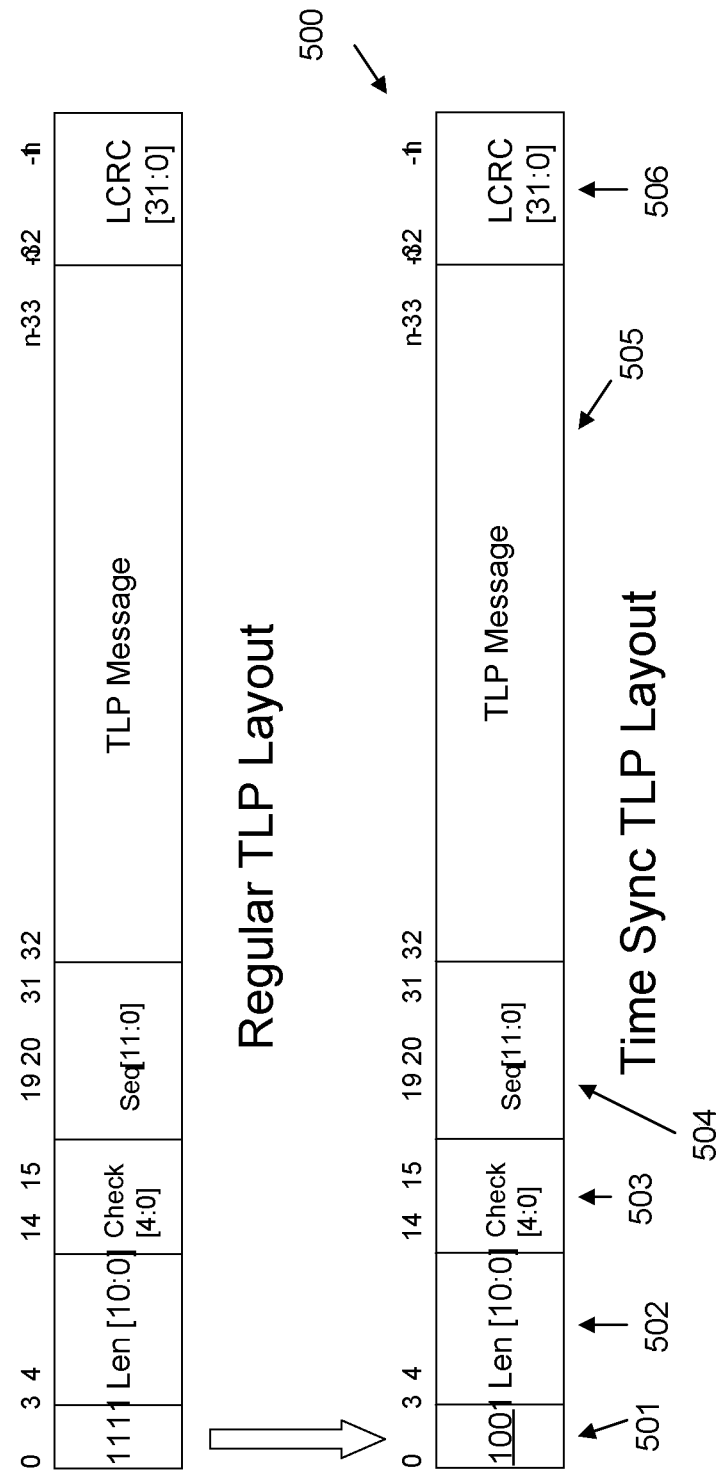
FIG. 5 illustrates a modified framing mechanism used for third generation encoding (8 GT/s with 128b/130b encoding) in accordance with various aspects of the present disclosure.

FIG. 5 illustrates a modified framing mechanism used for third generation encoding (8 GT/s with 128b/130b encoding) in accordance with various aspects of the present disclosure. FIG. 5 is analogous to FIG. 4, expect that the third generation is shown in FIG. 5 as opposed to the first and second generation encoding as shown in FIG. 4. Time synchronization transport layer protocol packet 500 includes header 501 that is arranged to identify packet 500 as a packet containing time synchronization information. Field 502 includes Len[10:0] which refers to the length of the overall packet. For example, the length may be presented as four byte doublewords (DW). Field 504 includes Seq[11:0] which is the sequence number of the TLP. Field 503 includes Check[4:0] which provides data integrity for the Len, Check and Seq fields. Instead of a framing symbol STS as shown in FIG. 4, the four bit field 501 at the start identifies the type of a packet, so that a regular TLP can be distinguished from a Time Sync Message as the physical layer. Again, the field 505 labeled "TLP Message" is the packet shown in FIG. 3. Note that FIGS. 4 and 5 are not to scale.

Figure 6:
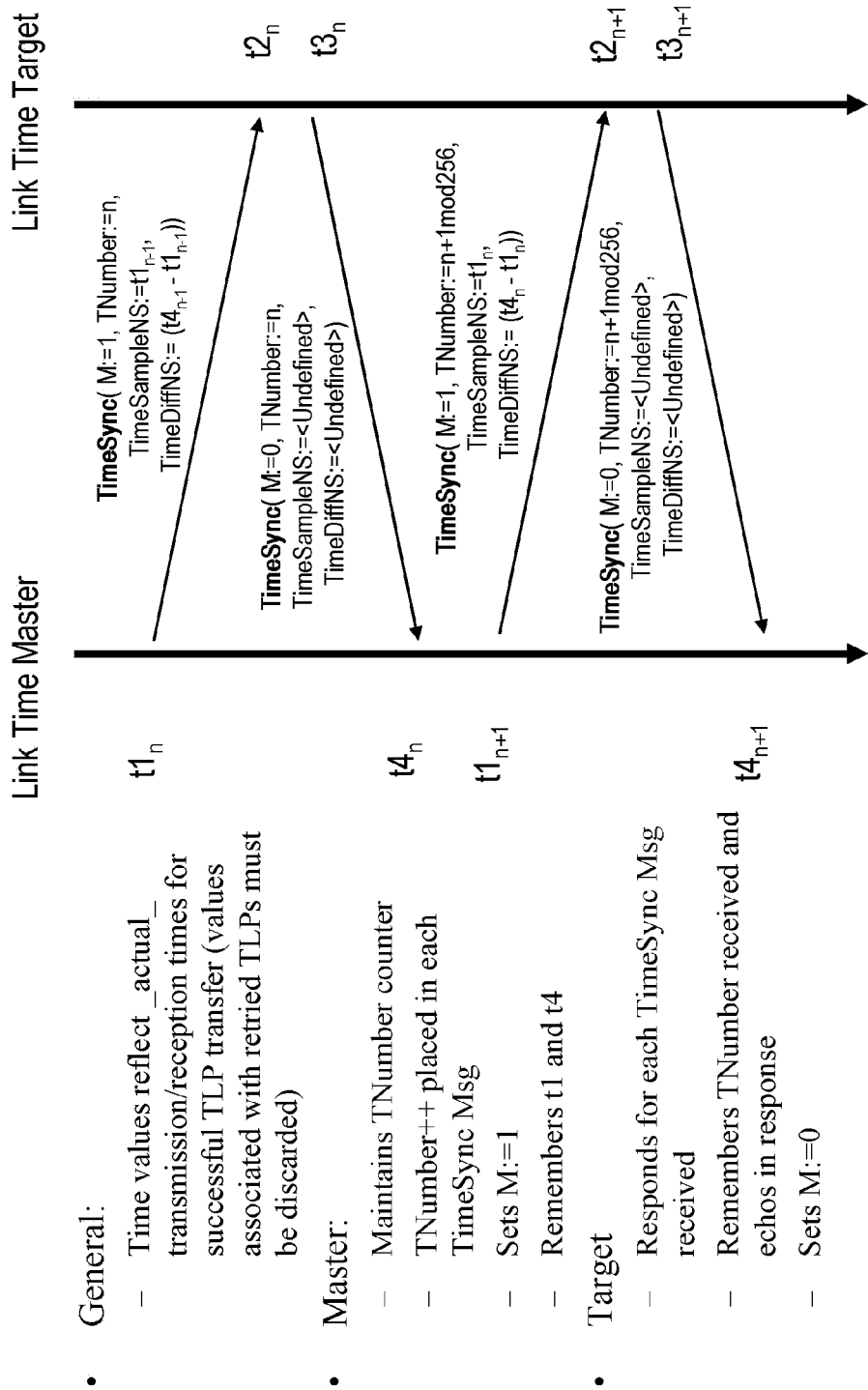
FIG. 6 illustrates a protocol for exchanging messages that enables communication delays to be factored out in accordance with various aspects of the present disclosure.

FIG. 6 is a protocol for exchanging the modified messages that enables communication delays to be factored out in accordance with various aspects of the present disclosure. At time $t1_n$, the master device transmits a TimeSync message to a target device. The target device receives the message at time $t2_n$. The TimeSync message includes M bit or flag 332 set equal to 1, Tnumber field 134 set to equal n, TimeSamplesNS field 135 set equal to $t1_{n-1}$, and TimeDiffNS field 136 set equal to $t4_{n-1}-t1_{n-}$. For example, the TimeSync message format would be TimeSync(M:=1, TNumber:=n, TimeSampleNS:=$t1_{n-1}$, TimeDiffNS:=($t4_{n-1}-t1_{n-1}$)). The master device maintains the TNumber counter and places TNumber++ in each TimeSync message. The master device also set M:=1 and remembers t1 and t4. In response, target device transmits TimeSync message at time $t3_n$ and master device receives the TimeSync message at time $t4_n$. The TimeSync message transmitted by target device at time $t3_n$ includes TimeSync (M:=0, TNumber:=n, TimeSampleNS:=<Undefined>, TimeDiffNS:=<Undefined>. The target device responds for each TimeSync message received, remembers TNumber received and echoes in response, and sets M:=0. The time values reflect actual transmission/reception times for successful TLP transfers. Time values associated with retired TLP's must be discarded.

At time $t1_{n+1}$, the master device transmits a TimeSync message to a target device. The target device receives the message at time $t2_{n+1}$. For example, the TimeSync message format would be TimeSync(M:=1, TNumber:=n+1 mod 256, TimeSampleNS:=$t1_n$, TimeDiffNS:=($t4_n-t1_n$)). In response, target device transmits TimeSync message at time $t3_{n+1}$ and master device receives the TimeSync message at time $t4_{n+1}$. The TimSync message transmitted by target device at time $t3_{n-1}$ includes TimeSync (M:=0, TNumber:=n+1 mod 256, TimeSampleNS:=<Undefined>, TimeDiffNS:=<Undefined>.

Special symbols, referred to as K-codes, used in PCIe 2.5 GT/s and 5 GT/s modes of operation are shown in Table 1. As shown in the table, a new K-code, K28.6, is used with the 2.5 GT/s and 5 GT/s versions of PCIe for Start of Time Sync Messages TLPs.

TABLE 1

| Encoding | Symbol | Name | Description |
| --- | --- | --- | --- |
| K28.5 | COM | Comma | Used for Lane and Link initialization and management |
| K27.7 | STP | Start TLP | Marks the start of a Transaction Layer Packet |
| K28.2 | SDP | Start DLLP | Marks the start of a Data Link Layer Packet |
| K29.7 | End | End | Marks the end of a Transaction Layer Packet or a Data Link Layer Packet |
| K30.7 | EDB | EnD Bad | Marks the end of a nullified TLP |
| K23.7 | PAD | Pad | Used in Framing and Link Width and Lane ordering negotiations |
| K28.0 | SKP | Skip | Used for compensating for different bit rates for two communicating Ports |
| K28.1 | FTS | Fast Training Sequence | Used within an Ordered Set to exit from L0s to L0 |
| K28.3 | IDL | Idle | Used in the Electrical Idle Ordered Set (EIOS) |
| K28.4 | | | Reserved |
| K28.6 | STS | Start Time Sync TLP | Start Time Sync TLP |
| K28.7 | EIE | Electrical Idle Exit | Reserved in 2.5 GT/s Used in the Electrical Idle Exit Ordered Set (EIEOS) and sent prior to sending FTS at speeds other than 2.5 GT/s |

Figure 7:
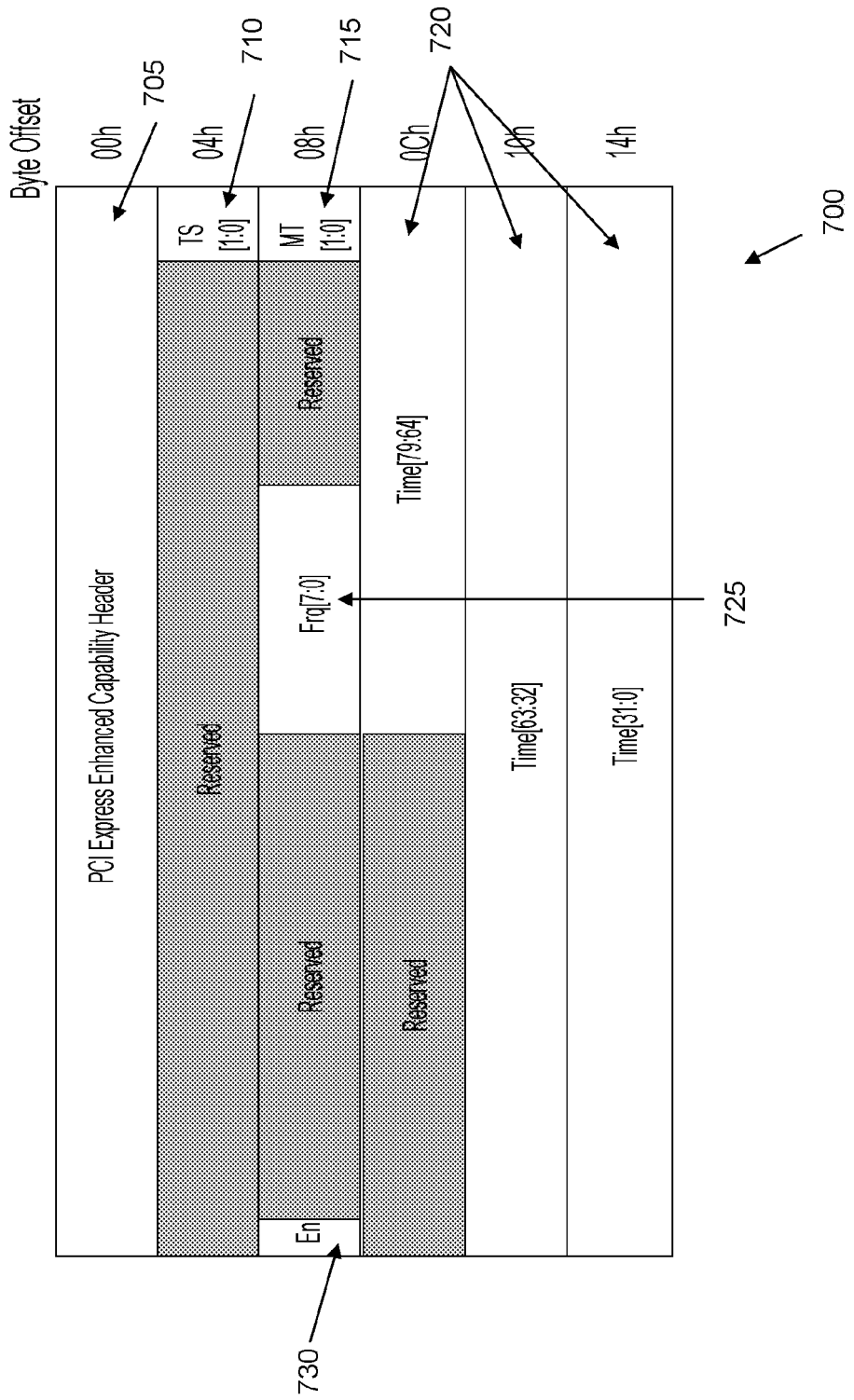
FIG. 7 is a software configuration mechanism implemented using a PCIe Enhanced Capability Structure in accordance with various aspects of the present disclosure.

FIG. 7 is a software configuration mechanism implemented using a PCIe Enhanced Capability Structure in accordance with various aspects of the present disclosure. The mechanism, shown generally at 700, includes PCIe Express Capability Header 605. TS[1:0] 710 field is a read only field and provides time synchronization capability of the device. If the device is capable of being grand master, TS 710 is set to 11. If the device is capable of being master, TS 710 is set to 1x. If the device is capable of being a target only, TS 710 is set to 00. A grand master is a device selected to be the source from which all other associated masters derive their time values.

MT[1:0] 715 field is a read-write field and can be set depending on the assigned functionality of device. If the device is to be a grand master, MT is set to 11. MT 715 can be set to grand master by default for a Root Complex. Setting 10 of MT 715 is reserved for future use and designation. If the device is a master, MT 715 is set to 01, which is the default for downstream ports. If the device is a target, MT 715 is set to 00, which is the default for upstream ports.

Time[47:0] 720 field is a sample of the device's time clock. The field is read-only for all devices except a grand master. If the device is a grand master, the field is read-write to software and can also be set by hardware using implementation-specific mechanisms. Bytes are permitted to be written (in any order) only when Disabled, and the grand master clock starts counting from the written time when Enabled.

Frq[7:0] 725 field is for a frequency of sending messages and is a read-write field. The field is implemented for grand masters and masters only, and is reserved for target only devices. Field 725 is encoded to include range of once per 10 s to 100 kHz.

En 730 field is an enable/disable bit. Bit 730 enables masters and grand masters to transmit time synchronization messages and causes targets to respond to received messages. For a grand master, it is possible for hardware to implement a mechanism that further improves accuracy by synchronizing the activation of the grand master with some implementation specific reference following the setting by software of the enable bit.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A computer program product comprising:
   a non-transitory computer readable medium having a computer readable program code embodied therein, said computer readable program code adapted to be executed to implement a method comprising:
   attaching a header to a transaction layer protocol layout packet at a master device to synchronize time between the master device and a target device arranged across a network, wherein the header is arranged to identify the packet as a time synchronization packet; and
   transmitting the packet with attached header from a master device to a target device to synchronize time between the master and target device.

2. The computer program product according to claim 1, wherein the attached header includes a time synchronization marker.

3. The computer program product according to claim 2, wherein the time synchronization marker includes a bit, a series of bits, a flag, or a K code.

4. The computer program product according to claim 1, wherein the target device communicates to the master device through a PCIe interconnect.

5. The computer program product according to claim 1, wherein the packet includes a message indicator.

6. The computer program product according to claim 5, comprising receiving a reply message at a subsequent time from the target device to the master device, the reply message including the message indicator.

7. The computer program product according to claim 5, comprising transmitting a second message from the master device to the target device, the second message including a subsequent message indicator and receiving another reply message at a subsequent time from the target device to the master device, the reply message including the subsequent message indicator.

8. The computer program product according to claim 7, wherein the subsequent message indicator is arranged to indicate that the message originated at the master device, another serial number of a second time measurement, a second sample time value, and a time difference value.

9. The computer program product according to claim 5, comprising correlating a timestamp based on the message indicator.

10. The computer program product according to claim 5, wherein the message indicator is set to 1 when a transmitting device is the master device and the message indicator is set to 0 when the transmitting device is the target device.

11. The computer program product according to claim 5, wherein the master device is configured to store the time the messages were transmitted to the target device.

12. The computer program product according to claim 5, wherein the message indicator is arranged to indicate that the message originated at the master device, a serial number of a time measurement, a sample time value, and a time difference value.

13. The computer program product according to claim 5, wherein the wherein the reply message includes the message indictor that is arranged to indicate that the message originated at the target device, the serial number, the sample time value arranged to indicate an undefined time value, and the time difference value arranged to indicate an undefined time difference value.

14. A system comprising:
   a controller configured to apply modified framing to a header attached to a transaction layer protocol layout packet at a master device, wherein the header arranged to identify the packet as a time synchronization packet;
   a transmitter configured to transmit the packet with the modified framing from the master device to a target device to synchronize time between the master device and target device; and
   a receiver configured to receive the transmitted packet.

15. The system according to claim 14, wherein the header includes a time synchronization marker.

16. The system according to claim 14, wherein the target device communicates to the master device through a PCIe interconnect.

17. The system according to claim 14, wherein the packet includes a message indicator.

* * * * *